United States Patent [19]

Glover et al.

[11] Patent Number: 5,605,303

[45] Date of Patent: Feb. 25, 1997

[54] METHOD OF RELEASABLY ATTACHING A FILMSTRIP TO A FILM CASSETTE SPOOL

[75] Inventors: Edward C. T. S. Glover, London; Anthony Earle, Middlesex, both of England

[73] Assignee: Eastman Kodak Company, Rochester, N.Y.

[21] Appl. No.: 516,681

[22] Filed: Aug. 18, 1995

[30] Foreign Application Priority Data

Aug. 24, 1994 [GB] United Kingdom .................. 9417131

[51] Int. Cl.⁶ ............................................... B65H 75/28
[52] U.S. Cl. ................................ 242/584.1; 242/348.1
[58] Field of Search ........................... 242/348, 348.1, 242/348.3, 584.1; 354/275

[56] References Cited

U.S. PATENT DOCUMENTS

| | | |
|---|---|---|
| 3,650,389 | 3/1972 | Mook . |
| 4,145,133 | 3/1979 | Wareham . |
| 4,334,750 | 6/1982 | Fichter . |
| 4,338,015 | 7/1982 | Holmes . |
| 4,834,310 | 5/1989 | Ikariya et al. . |
| 5,054,710 | 10/1991 | Ikariya et al. . |
| 5,215,273 | 6/1993 | Greene ................................. 354/275 |
| 5,449,125 | 9/1995 | Reinke et al. ...................... 242/348.1 |

FOREIGN PATENT DOCUMENTS

| | | |
|---|---|---|
| 891267 | 3/1944 | France . |
| 1285293 | 12/1968 | Germany ............................ 354/275 |
| 1522260 | 8/1969 | Germany . |
| 4-124653 | 4/1992 | Japan ............................... 242/584.1 |

*Primary Examiner*—John P. Darling
*Attorney, Agent, or Firm*—Frank Pincelli

[57] ABSTRACT

A method of releasably attaching a filmstrip to the spool of a film cassette. The method includes inserting the filmstrip into a slot until an aperture in the filmstrip engages with a protrusion located in the slot of the spool. Subsequent withdrawal of the filmstrip is achieved by further inserting the filmstrip into the slot to disengage the aperture and the protrusion, moving the filmstrip in a direction transverse to the direction of insertion into the slot to misalign the aperture and the protrusion and then withdrawing the filmstrip from the slot in a direction which is reverse to that of insertion.

2 Claims, 3 Drawing Sheets

METHOD OF RELEASABLY ATTACHING A FILMSTRIP TO A FILM CASSETTE SPOOL

FIELD OF THE INVENTION

The present invention relates to a method of releasably attaching a filmstrip to a film cassette spool, and is particularly concerned with such a method which allows for repeated use of the film cassette spool.

BACKGROUND OF THE INVENTION

It is well known to rotatably support a filmstrip on a spool within a film cassette. In some such arrangements, the end of the filmstrip adjacent the spool is not secured thereto and there is a risk that the filmstrip will inadvertently become detached from the spool and hence be wholly withdrawn from the cassette during its exposure. One such arrangement is described in U.S. Pat. No. 4,145,133.

There are other arrangements which overcome this problem by attaching the trailing end of the filmstrip to the spool. These arrangements prevent the filmstrip being fully extracted from the cassette during exposure, but necessitate the use of a cutter to detach the filmstrip from the spool prior to processing.

U.S. Pat. No. 5,054,710 discloses a spool for a camera on to which a filmstrip is to be wound during exposure. The spool includes a shaft having a slit formed therein. A protrusion is located in the slit to engage a perforation in the leading edge of the filmstrip, the filmstrip being wound on to the spool as it is exposed in the camera. When the filmstrip is fully exposed, it is unwound from this spool back into its cassette. The leading edge of the filmstrip slips out of the slit as the wall of the perforation engaging the protrusion slides down an angled wall thereof to release the filmstrip from the spool.

U.S. Pat. No. 4,334,750 discloses an arrangement for a spool in a film cassette which allows the trailing end of the filmstrip to be released. The arrangement comprises a hollow spool having a slot formed in its wall. A retaining member is located within the hollow spool and carries a protrusion for engaging a perforation in the trailing end of the filmstrip to retain it in the slot. When it is desired to release the filmstrip from the spool, the retaining member is pushed inwardly with respect to the spool so that the protrusion is forced out of the slot thereby releasing the perforation and the trailing end. Once pushed in, the retaining member cannot be withdrawn from the spool.

Problem to be Solved by the Invention

In arrangements for permanently attaching the filmstrip to the spool, it is necessary to cut the filmstrip to detach it from the spool so that it can be processed. This means that a small piece of filmstrip remains attached to the spool which then has to be removed by hand prior to the spool being re-used.

Although the arrangement described in U.S. Pat. No. 4,334,750 allows the filmstrip to be detached from the spool without having to sever it therefrom, the spool is complex and cannot be re-used.

SUMMARY OF THE INVENTION

It is therefore an object of the present invention to provide a method of releasably attaching a filmstrip to a film cassette spool which overcomes the problems mentioned above.

In accordance with one aspect of the present invention, there is provided a method of releasably attaching a filmstrip to a film cassette spool, the cassette spool comprising a body portion having a slot formed therein, the slot having retaining means for retaining an end of the filmstrip, the method comprising the steps of:

a) inserting the end of the filmstrip in a first direction into the slot in the body portion;

b) engaging the end of the filmstrip with the retaining means to effect attachment of the filmstrip to the spool; and c) withdrawing the filmstrip in a direction which is the reverse to the first direction from the slot to effect detachment of the filmstrip from the spool;

characterized in that step c) includes the steps of:

d) further inserting the end of the filmstrip into the slot in the first direction to disengage the end of the filmstrip from the retaining means; and e) moving the filmstrip in a second direction which is transverse to the first direction to misalign the end of the filmstrip with the retaining means prior to withdrawal of the filmstrip from the slot.

In accordance with another aspect of the present invention, there is provided a filmstrip for used in the method described above, the filmstrip having an end which is narrower than the width of the slot in the body portion of the spool.

Advantageous Effect of the Invention

The method of the present invention can easily be applied to existing film cassette spools by making the trailing end of the filmstrip which is to be attached to the spool narrower than the width of the slot in which it is retained when attached thereto. Existing film cassette spools can be utilized.

BRIEF DESCRIPTION OF THE DRAWINGS

For a better understanding of the present invention, reference will now be made, by way of example only, to the accompanying drawings in which.

DETAILED DESCRIPTION OF THE INVENTION

In existing arrangements for attaching a trailing end of a filmstrip to a film cassette spool, the width of the trailing end is no greater than the width of the slot formed in the spool and is preferably substantially the same width. This means that there is engagement between the edges of the trailing end and the walls of the slot. As a consequence, there is little or no lateral movement of the trailing end with respect to the slot.

The method of the present invention necessitates that there is lateral movement of the trailing end of the filmstrip within the slot. It is necessary to cut the trailing end of the filmstrip so that it is narrower than the slot into which it is to be inserted. This means that the trailing end of the filmstrip is not retained at its edges and is free to move laterally within the slot as required.

Figure 1:
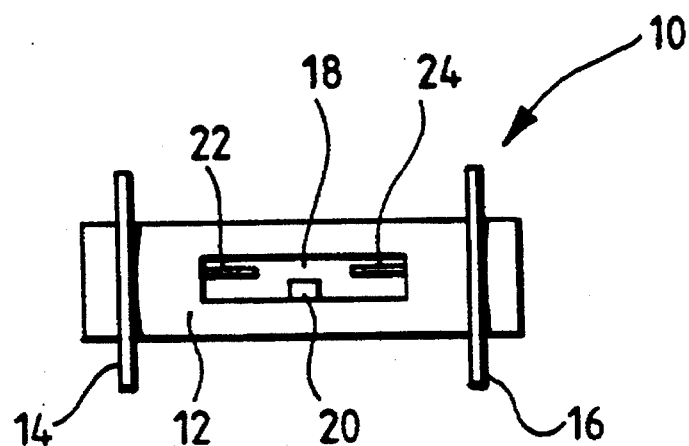
FIG. 1 a schematic side elevation of an existing spool for a film cassette.

FIG. 1 illustrates an existing film cassette spool 10. The spool 10 comprises a body portion 12 which carries two flange members 14, 16 spaced apart along the body portion a distance to accommodate the width of the filmstrip to be wound thereon. A slot 18 is formed in the body portion 12 for retaining the trailing end of the filmstrip (not shown). The slot 18 has a central protrusion 20 and two shoulder portions 22, 24 formed one on either side of the protrusion 20. The trailing end of the filmstrip is inserted over protrusion 20 but under shoulder portions 22, 24.

Figure 2:
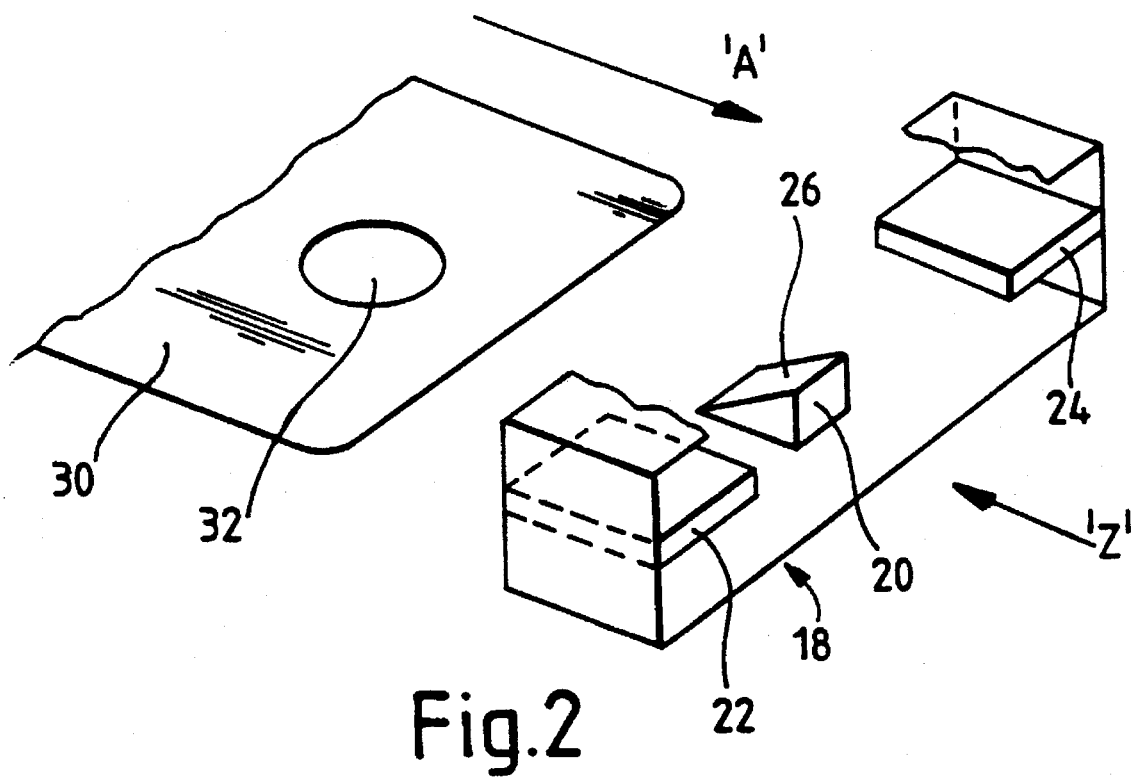
FIG. 2 is a schematic perspective view of a trailing end of a filmstrip coming into engagement with a slot in spool as shown in FIG. 1.

FIG. 2 illustrates schematically the slot 18 and a trailing end 30 of a filmstrip. The trailing end 30 has an aperture 32 formed therein for engagement with the protrusion 20 when inserted into the slot 18 in the direction indicated by arrow 'A'. The protrusion 20 has a ramped surface 26 which allows the front edge of the trailing end 30 of the filmstrip to pass thereover until the aperture 32 falls over the protrusion 20 to effect engagement therewith. Movement of the filmstrip in a direction reverse to that indicated by arrow 'A' is not possible as is conventional.

Referring now to FIGS. 3A, 3B, 3C, 3D, 3E, 3F, 3G, 4A, 4B, 4C, 4D, 4E, 4F and 4G, attachment and detachment of the trailing end of a filmstrip with the film cassette spool will be described.

Figure 3A:
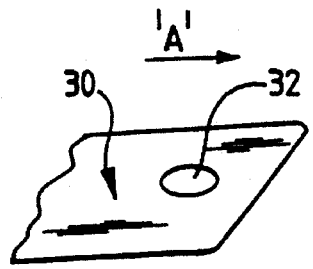
FIGS. 3A, 3B, 3C, 3D, 3E, 3F and 3G illustrate schematically the steps for attaching and detaching the filmstrip.
Figure 4A:
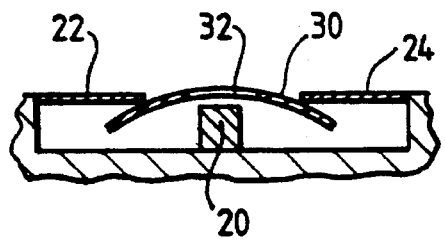
FIGS. 4A, 4B, 4C, 4D, 4E, 4F and 4G correspond to FIGS. 3A, 3B, 3C, 3D, 3E, 3F and 3G when viewed in the direction of arrow 'Z' in FIG. 2.
Figure 3B:
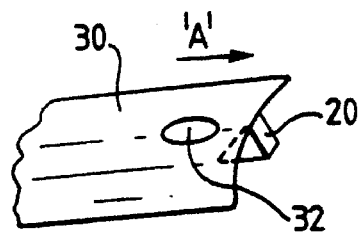
Figure 4B:
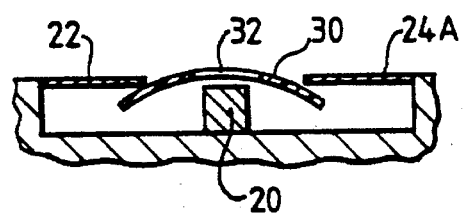
Figure 3C:
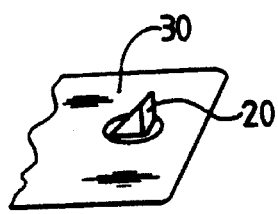
Figure 4C:
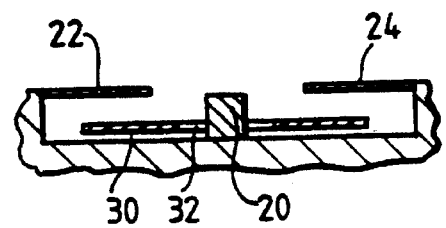

In FIGS. 3A and 4A, the trailing end 30 is shown approaching the protrusion 20 as it is inserted into the slot 18 in the direction of arrow 'A'. As the trailing end 30 encounters the protrusion 20, it passes up over the ramped surface 26, as shown in FIGS. 3B and 4B. Further insertion in the direction of arrow 'A' (FIG. 2) causes the aperture 32 in the trailing end 30 to pass over the protrusion 20 and become engaged therewith (FIGS. 3C and 4C). In this position, the filmstrip is retained in the slot 18 by the protrusion 20. The remainder of the filmstrip (not shown) can then be wound on to the spool 10 between the flange members 14, 16 (FIG. 1).

Figure 3D:
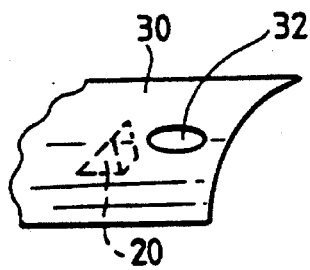
Figure 4D:
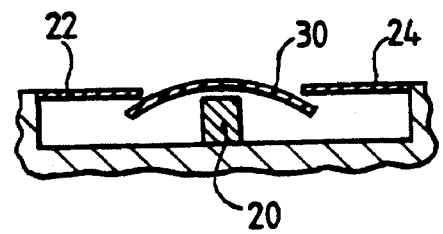

When it is desired to detach the filmstrip from its spool, for example, for processing the filmstrip after exposure in a camera, the filmstrip is fully unwound from the spool and the trailing end 30 is pushed further into the slot 18 in the direction of arrow 'A', FIG. 2, so that the aperture 32 is pushed up ramped surface 26 as shown in FIGS. 3D and 4D. Here, the trailing end 30 is no longer engaged with the protrusion 20. However, movement of the trailing end 30 in a direction reverse to that indicated by arrow 'A; would cause the protrusion 20 to re-engage with the aperture 32.

Figure 3E:
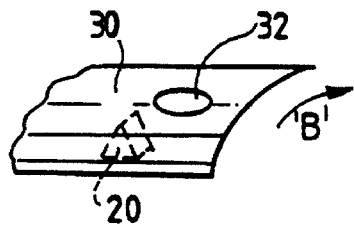
Figure 4E:
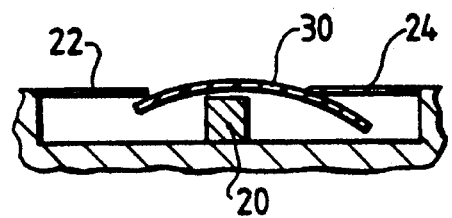
Figure 3F:
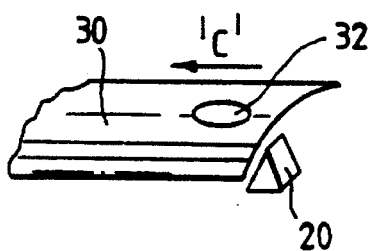
Figure 4F:
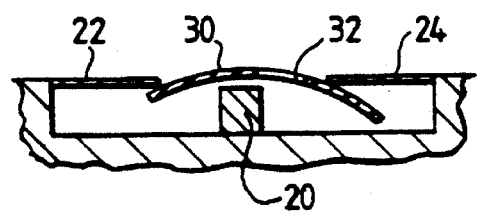

FIGS. 3E and 4E illustrate lateral movement of the trailing end 30 with respect to the slot 18. This lateral movement, in the direction indicated by arrow 'B', moves the aperture 32 out of alignment with the protrusion 20. This allows the trailing end 30 to be withdrawn from the slot 18, in the direction indicated by arrow 'C', as shown in FIGS. 3F and 4F.

Figure 3G:
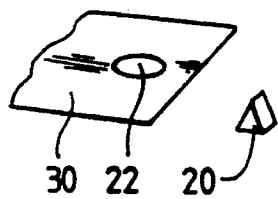
Figure 4G:
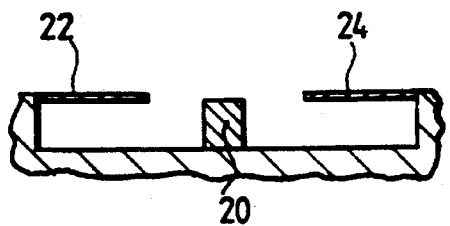

FIGS. 3G and 4G show total disengagement of the trailing end 30 and the slot 18.

Although the present invention is described with reference to photographic films and film cassette spools, it could easily be utilized in any field where a strip of material needs to be releasably attached to a spool.

Furthermore, the invention could be used with any suitable material supplied in strip form.

Parts List

10 . . . cassette spool
12 . . . body portion
14, 16 . . . flange members
18 . . . slot
20 . . . central protrusion
22, 24 . . . shoulder protrusions
26 . . . ramped surface
30 . . . trailing end
32 . . . aperture

We claim:

1. A method of releasably attaching a filmstrip to a film cassette spool, the cassette spool comprising a body portion having a slot formed therein, the slot having retaining means for retaining an end of the filmstrip, the method comprising the steps of:

a) inserting the end of the filmstrip in a first direction into the slot in the body portion;

b) engaging the end of the filmstrip with the retaining means to effect attachment of the filmstrip to the spool; and c) withdrawing the filmstrip in a direction which is the reverse to the first direction from the slot to effect detachment of the filmstrip from the spool;

characterized in that step c) includes the steps of:

d) further inserting the end of the filmstrip into the slot in the first direction to disengage the end of the filmstrip from the retaining means; and e) moving the filmstrip in a second direction which is transverse to the first direction to misalign the end of the filmstrip with the retaining means prior to withdrawal of the filmstrip from the slot.

2. A method according to claim 1 wherein the filmstrip has an end which is narrower than the width of the slot in the body portion of the spool.

* * * * *